United States Patent
Sugiyama et al.

(10) Patent No.: US 11,365,298 B2
(45) Date of Patent: Jun. 21, 2022

(54) SHEET FORMED FROM CARBON FIBER REINFORCED THERMOPLASTIC RESIN, AND PRODUCTION METHOD OF SAID SHEET

(71) Applicant: MITSUBISHI GAS CHEMICAL COMPANY, INC., Tokyo (JP)

(72) Inventors: Genki Sugiyama, Tokyo (JP); Kohei Yoshiya, Ibaraki (JP); Hidetaka Shimizu, Ibaraki (JP); Hiroyoshi Maruyama, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 346 days.

(21) Appl. No.: 16/608,644

(22) PCT Filed: May 14, 2018

(86) PCT No.: PCT/JP2018/018456
§ 371 (c)(1),
(2) Date: Oct. 25, 2019

(87) PCT Pub. No.: WO2018/216516
PCT Pub. Date: Nov. 29, 2018

(65) Prior Publication Data
US 2020/0140635 A1 May 7, 2020

(30) Foreign Application Priority Data
May 24, 2017 (JP) .............................. JP2017-102250

(51) Int. Cl.
C08J 5/24 (2006.01)
C08J 5/18 (2006.01)
C08J 5/04 (2006.01)
C08J 7/12 (2006.01)
C08K 5/02 (2006.01)

(52) U.S. Cl.
CPC .............. *C08J 5/18* (2013.01); *C08J 5/042* (2013.01); *C08J 5/24* (2013.01); *C08J 7/12* (2013.01); *C08K 5/02* (2013.01); *C08J 2367/03* (2013.01); *C08J 2369/00* (2013.01)

(58) Field of Classification Search
USPC ................... 428/412; 528/196, 198
See application file for complete search history.

(56) References Cited

U.S. PATENT DOCUMENTS

| | | | |
|---|---|---|---|
| 5,028,640 A | 7/1991 | Shimaoka et al. | |
| 2008/0166511 A1* | 7/2008 | Honma | C08G 59/5033 428/36.4 |
| 2017/0015782 A1 | 1/2017 | Watanabe | |
| 2017/0036376 A1 | 2/2017 | Kurokawa | |
| 2017/0306089 A1 | 10/2017 | Nakayasu et al. | |

FOREIGN PATENT DOCUMENTS

| | | |
|---|---|---|
| EP | 0 197 351 | 10/1986 |
| JP | 61-252235 | 11/1986 |
| JP | S6335621 | 2/1988 |
| JP | 02-145644 | 6/1990 |
| JP | 06-057640 | 3/1994 |
| JP | 2005-225993 | 8/2005 |
| JP | 2005225993 A * | 8/2005 |
| JP | 2010-215791 | 9/2010 |
| JP | 2013-166839 | 8/2013 |
| JP | 2015-203058 A | 11/2015 |

(Continued)

OTHER PUBLICATIONS

JP2016079276A Machine Translation; Genki Sugiyama et al.; Polycarbonate resin, and sheet, film, and thermally molded article formed using resin (Year: 2016).*
JP2005225993A Machine Translation; Method for producing conductive fiber-reinforced resin material Inventor Nobuhiro Ono (Year: 2004).*
Smith et al., "Fabrication of woven carbon fibre/ poly carbonate repair patches", Composites Part A 27A, 1996, pp. 1089-1095.
Official Communication issued in International Bureau of WIPO Patent Application No. PCT/JP2018/018456, dated Jul. 10, 2018.
Extended European Search Report dated Apr. 29, 2020 in European patent application No. 18806735.9.
Smith, F. C. et al. "Fabrication of woven carbon fibre/ polycarbonate repair patches", Composites Part A 27 A (1996) pp. 1089-1095.

* cited by examiner

*Primary Examiner* — Terressa Boykin
(74) *Attorney, Agent, or Firm* — Greenblum & Bernstein. P.L.C.

(57) ABSTRACT

A sheet formed from carbon fiber reinforced thermoplastic resin with high moldability, and a production method of said resin is provided. This sheet is formed from a carbon fiber reinforced thermoplastic resin that contains carbon fibers, dichloromethane, and a thermoplastic resin containing at least one of a polycarbonate resin and a polyarylate resin. The aforementioned at least one of a polycarbonate resin and a polyarylate resin has a terminal structure derived from a monohydric phenol represented by formula (1) and a constituent unit derived from a dihydric phenol, and the content of the dichloromethane contained in the sheet is 10-10,000 ppm by mass. (In formula (1), $R_1$ represents an alkyl group with 8-36 carbons, or an alkenyl group with 8-36 carbons, and $R_2$-$R_5$ independently represent a hydrogen, a halogen, an alkyl group with 1-20 carbons optionally having a substituent, or an aryl group with 6-12 carbons optionally having a substituent.)

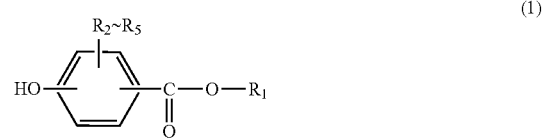

(1)

8 Claims, No Drawings

(56) References Cited

FOREIGN PATENT DOCUMENTS

| | | | |
|---|---|---|---|
| JP | 2016-079276 | | 5/2016 |
| JP | 2016079276 A | * | 5/2016 |
| WO | 2015129638 | | 7/2015 |
| WO | 2015/159813 | | 10/2015 |
| WO | 2016/060100 A1 | | 4/2016 |
| WO | 2017/104482 | | 6/2017 |

SHEET FORMED FROM CARBON FIBER REINFORCED THERMOPLASTIC RESIN, AND PRODUCTION METHOD OF SAID SHEET

FIELD OF THE INVENTION

The present invention relates to a sheet formed from a carbon fiber reinforced thermoplastic resin, which can favorably be used as an aircraft part, a spacecraft part, an automobile part, a watercraft part, an electronic device part, a sports-related part or the like, and to a method for producing said sheet.

BACKGROUND ART

Since carbon fibers, glass fibers and aramid fibers are excellent in elastic modulus and strength with a lower density as compared to metals, composite materials obtained by combining these fibers with various matrix resins are used in many fields such as aircraft parts, spacecraft parts, automobile parts, watercraft parts, construction materials and sporting goods. In particular, a carbon fiber reinforced resin (CFRP) which is a composite material consisting of a combination of carbon fibers and an epoxy resin or an unsaturated polyester resin is widely used.

Although carbon fiber reinforced resins that have a conventional thermosetting resin as the matrix are disadvantageous as they require a great deal of time for thermosetting, carbon fiber reinforced thermoplastic resins that have a thermoplastic resin as the matrix (hereinafter, sometimes referred to as "CFRTP") have recently been developed in the expectation for use as a composite material that allows high-cycle molding.

While a short fiber reinforced thermoplastic resin that allows molding of a complicated shape has already been put to practical use, it is disadvantageous for having the problem of significantly low elastic modulus as compared to lightweight metals due to the short fiber length of the reinforcement fibers. Therefore, there is a strong demand for a continuous fiber reinforced thermoplastic resin.

Patent document 1 discloses an aromatic polycarbonate resin composition comprising predetermined amounts of an aromatic polycarbonate-polyorganosiloxane copolymer, an aromatic polycarbonate, an aliphatic polyester, a naturally-occurring organic filler and an inorganic filler. According to Patent document 1, a polycarbonate which is terminally modified with a long-chain alkylphenol, for example, p-dodecylphenol is used, but the document does not disclose a terminal structure that is derived from a monohydric phenol represented by General formula (1) below. In addition, although it aims at enhancement of the mechanical properties, especially flame retardancy, by using the polycarbonate which is terminally modified with a long-chain alkylphenol in the aromatic polycarbonate resin composition, it does not mention about enhancement of molding workability at all. In the meantime, Patent document 2 discloses carbon fiber chopped strands and a carbon fiber reinforced thermoplastic resin composition comprising said carbon fibers. Although the document discloses that various monohydric phenols can be used for this resin composition, it does not disclose a monohydric phenol represented by General formula (1) below. Moreover, although Patent document 2 discloses highly heat resistant and highly stable carbon fiber chopped strands, it does not mention about enhancement of molding workability at all.

Accordingly, although the continuous fiber reinforced thermoplastic resins obtained in Patent documents 1 and 2 have good mechanical properties and good heat resistance, they require further improvement in molding workability.

PRIOR ART DOCUMENTS

Patent Documents

Patent document 1: Japanese Unexamined Patent Application Publication No. 2010-215791
Patent document 2: Japanese Unexamined Patent Application Publication No. H06-57640

DISCLOSURE OF THE INVENTION

Problem to be Solved by Invention

The present invention has an objective of providing a sheet formed from a carbon fiber reinforced thermoplastic resin with high molding workability (with a greater amount of heat deformation under a low temperature environment), and a method for producing said sheet.

Means for Solving Problem

The present inventors have gone through intensive studies to solve the aforementioned problem, and as a result of which found that a thermoplastic resin containing at least one of a polycarbonate resin and a polyarylate resin with a specified structure can be used to obtain a sheet formed from a carbon fiber reinforced thermoplastic resin with high molding workability (with a greater amount of heat deformation under a low temperature environment), thereby accomplishing the present invention. Thus, the above-mentioned problem can be solved by the present invention hereinbelow.

<1> A sheet formed from a carbon fiber reinforced thermoplastic resin comprising carbon fibers, dichloromethane and a thermoplastic resin containing at least one of a polycarbonate resin and a polyarylate resin, wherein at least one of the polycarbonate resin and the polyarylate resin has a terminal structure derived from a monohydric phenol represented by General formula (1) below and a constituent unit derived from a dihydric phenol, and the content of dichloromethane contained in the sheet is 10-10,000 ppm by mass:

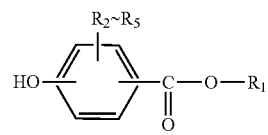

(in General formula (1), $R_1$ represents a C8-C36 alkyl group or a C8-C36 alkenyl group, and $R_2$-$R_5$ each independently represent hydrogen, a halogen, an optionally substituted C1-C20 alkyl group or an optionally substituted C6-C12 aryl group).

<2> The sheet according to <1> above, wherein the carbon fibers are continuous fibers.

<3> The sheet according to either one of <1> and <2>, wherein the sheet comprises the carbon fibers for 20-80 vol % and the thermoplastic resin for 80-20 vol %.

<4> The sheet according to any one of <1> to <3> above, wherein the viscosity-average molecular weight of the polycarbonate resin and the polyarylate resin is 10,000-100,000.
<5> The sheet according to any one of <1> to <4> above, wherein the dihydric phenol is represented by General formula (2) below:

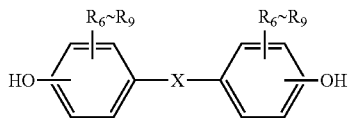

(in General formula (2), $R_6$-$R_9$ each independently represent hydrogen, a halogen, a nitro, an optionally substituted C1-C20 alkyl group, an optionally substituted C1-C5 alkoxy group, an optionally substituted C6-C12 aryl group, an optionally substituted C7-C17 aralkyl group or an optionally substituted C2-C15 alkenyl group; and
X is —O—, —S—, —SO—, —SO$_2$—, —CO— or a divalent group represented by any of Formulae (3) to (6) below):

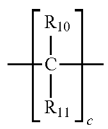

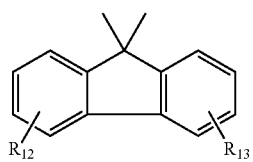

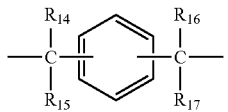

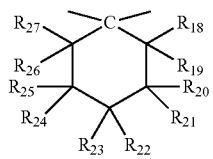

(in Formula (3), $R_{10}$ and $R_{11}$ each independently represent hydrogen, a halogen, an optionally substituted C1-C20 alkyl group, an optionally substituted C1-C5 alkoxy group, an optionally substituted C6-C12 aryl group, an optionally substituted C7-C17 aralkyl group or an optionally substituted C2-C15 alkenyl group, or
$R_{10}$ and $R_{11}$ bond with each other to form a C3-C20 carbon ring or a C1-C20 heterocyclic ring; and
c represents an integer of 0-20;
in Formula (4), $R_{12}$ and $R_{13}$ each independently represent hydrogen, a halogen, an optionally substituted C1-C20 alkyl group, an optionally substituted C1-C5 alkoxy group, an optionally substituted C6-C12 aryl group, an optionally substituted C7-C17 aralkyl group or an optionally substituted C2-C15 alkenyl group, or $R_{12}$ and $R_{13}$ bond with each other to form a C3-C20 carbon ring or a C1-C20 heterocyclic ring; and
in Formula (5), $R_{14}$-$R_{17}$ each independently represent hydrogen, a halogen, an optionally substituted C1-C20 alkyl group, an optionally substituted C1-C5 alkoxy group, an optionally substituted C6-C12 aryl group, an optionally substituted C7-C17 aralkyl group or an optionally substituted C2-C15 alkenyl group, or
$R_{14}$ and $R_{15}$, and $R_{16}$ and $R_{17}$ bond with each other, respectively, to form a C3-C20 carbon ring or a C1-C20 heterocyclic ring; and
in Formula (6), $R_{18}$-$R_{27}$ each independently represent hydrogen or a C1-C3 alkyl group, where at least one of $R_{18}$-$R_{27}$ is a C1-C3 alkyl group).
<6> A laminate sheet obtained by laminating the sheet according to any one of <1> to <5> above.
<7> A method for producing a carbon fiber reinforced thermoplastic resin sheet, the method comprising the steps of:
producing a thermoplastic resin solution by an interfacial polymerization process by dissolving a thermoplastic resin containing at least one of a polycarbonate resin and a polyarylate resin in dichloromethane;
impregnating carbon fibers with the thermoplastic resin solution; and
evaporating dichloromethane from the carbon fibers impregnated with the thermoplastic resin solution,
wherein at least one of the polycarbonate resin and the polyarylate resin has a terminal structure derived from a monohydric phenol represented by General formula (1) below and a constituent unit derived from a dihydric phenol:

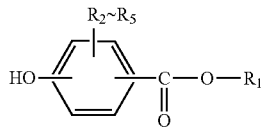

(in General formula (1), $R_1$ represents a C8-C36 alkyl group or a C8-C36 alkenyl group, and $R_2$-$R_5$ each independently represent hydrogen, a halogen, an optionally substituted C1-C20 alkyl group or an optionally substituted C6-C12 aryl group).
<8> The production method according to <7> above, wherein the concentration of the polycarbonate resin and the polyarylate resin in the thermoplastic resin solution is 10-30 mass %.

Effect of the Invention

According to the present invention, a thermoplastic resin containing at least one of a polycarbonate resin and a polyarylate resin having a specified structure can be used to produce a sheet formed from the carbon fiber reinforced thermoplastic resin with high molding workability. In comparison to general polycarbonate and polyarylate resins, a carbon fiber reinforced thermoplastic resin produced by impregnating with the thermoplastic resin containing at least one of the polycarbonate resin and the polyarylate resin having a specified structure of the present invention shows a greater amount of heat deformation under a low temperature environment, and therefore higher molding workability can be achieved.

MODE FOR CARRYING OUT THE INVENTION

Hereinafter, the present invention will be detailed by illustrating a production example, examples and the like, although the present invention is not limited to the illustrated production example or examples, and can be carried out by any alternative method as long as it does not depart from the scope of the present invention.

The sheet of the present invention is a sheet formed from a carbon fiber reinforced thermoplastic resin comprising carbon fibers, dichloromethane and a thermoplastic resin containing at least one of a polycarbonate resin and a polyarylate resin, wherein at least one of the polycarbonate resin and the polyarylate resin has a terminal structure derived from a monohydric phenol represented by General formula (1) above and a constituent unit derived from a dihydric phenol, and the content of dichloromethane contained in the sheet is 10-10,000 ppm by mass.

Carbon Fibers

The carbon fibers used for the present invention are preferably continuous fibers. The average fiber length of the continuous fibers is preferably 10 mm or longer and more preferably 30 mm or longer. In addition, the continuous fibers may take a form of a unidirectional sheet, a woven sheet, a multiaxial laminate sheet or the like.

While the number of single fibers included in a fiber bundle (filament), the number of filaments included in a bundle of filaments (tow) and the structure thereof may vary depending on the carbon fibers, the number of single fibers, the number of filaments and the structure thereof according to the present invention are not limited and various carbon fibers may be used.

The proportion of the carbon fibers in the carbon fiber reinforced thermoplastic resin of the present invention is preferably 20-80 vol %, and more preferably 30-70 vol % and still more preferably 40-60 vol % from the viewpoint of the mechanical properties of the carbon fiber reinforced thermoplastic resin.

Thermoplastic Resin

At least one of the polycarbonate resin and the polyarylate resin contained in the thermoplastic resin used for the present invention has a terminal structure derived from a monohydric phenol represented by General formula (1) below and a constituent unit derived from a dihydric phenol represented by General formula (1) below.

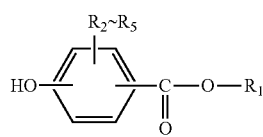

(1)

In General formula (1), $R_1$ represents a C8-C36 alkyl group or a C8-C36 alkenyl group, where the upper limit for the carbon number of $R_1$ is preferably 35, more preferably 22 and particularly preferably 18. The lower limit for the carbon number of $R_1$ is preferably 9 and more preferably 12.

In General formula (1), $R_2$-$R_5$ each independently represent hydrogen, a halogen, an optionally substituted C1-C20 alkyl group or an optionally substituted C6-C12 aryl group, preferably hydrogen, a halogen, an optionally substituted C1-C9 alkyl group or an optionally substituted C6-C8 aryl group, and particularly preferably hydrogen.

The monohydric phenol represented by General formula (1) above may be used as a chain terminator in polymerization reaction so as to be introduced into the polycarbonate resin or the polyarylate resin of the present invention. Examples of the monohydric phenol represented by General formula (1) above include, but not limited to, cetyl-4-hydroxybenzoate (CEPB), 2-ethylhexyl para-hydroxybenzoate (EHPB), hexadecyl para-hydroxybenzoate, and 2-hexyldecyl para-hydroxybenzoate.

For example, if a monohydric phenol represented by General formula (1) above which has a C16 alkyl group as $R_1$ is used as a chain terminator, the glass transition temperature, the melt fluidity, the moldability and the anti-drawdown property of the resulting polycarbonate resin or polyarylate resin will be superior, and also the solubility of the monohydric phenol in a solvent upon producing the polycarbonate resin or the polyarylate resin will be superior, and thus it is particularly favorable as a chain terminator used for the polycarbonate resin or the polyarylate resin of the present invention.

If the carbon number of $R_1$ in General formula (1) is too large, the solubility of the monohydric phenol in an organic solvent tends to be low, which may lead to deterioration of productivity upon producing the polycarbonate resin or the polyarylate resin. For example, if the carbon number of $R_1$ is 36 or less, high productivity and good economic efficiency can be achieved upon producing the polycarbonate resin or the polyarylate resin. If the carbon number of $R_1$ is 22 or less, the solubility of the monohydric phenol in an organic solvent will particularly be excellent, and thus productivity upon producing the polycarbonate resin or the polyarylate resin will be very high and economic efficiency is enhanced as well. On the other hand, if the carbon number of $R_1$ in General formula (1) is too small, the glass transition temperature of the polycarbonate resin or the polyarylate resin may not be low enough, which may lead to deterioration of heat moldability.

According to the required material properties, it is acceptable to use the main backbone or the chain terminator in combination with those having other structures, or to mix them with other polycarbonate resin or further with other transparent resin, within a range that does not depart from the scope of the present invention. Preferably, 80 mol % or more of the entire chain terminator used has the structure represented by Formula (1) above. More preferably, 90 mol % or more of the entire chain terminator used has the structure represented by Formula (1) above. Particularly preferably, the entire chain terminator used has the structure represented by Formula (1) above.

Examples of other chain terminators that can be used in combination include phenol, alkylphenols such as p-cresol, o-cresol, 2,4-xylenol, p-t-butylphenol, o-allylphenol, p-allylphenol, p-hydroxystyrene, p-hydroxy-α-methylstyrene, p-propylphenol, p-cumylphenol, p-phenylphenol, o-phenylphenol, p-trifluoromethylphenol, p-nonylphenol, p-dodecylphenol, eugenol, amylphenol, hexylphenol, heptylphenol, octylphenol, nonylphenol, decylphenol, dodecylphenol, myristylphenol, palmitylphenol, stearylphenol and behenylphenol, and alkyl para-hydroxybenzoates such as methyl ester, ethyl ester, propyl ester, butyl ester, amyl ester, hexyl ester and heptyl ester of para-hydroxybenzoic acid. Alternatively, two or more types of the above-mentioned monohydric phenols can be used in combination.

According to a preferable aspect of the present invention, at least one of the polycarbonate resin and the polyarylate resin contained in the thermoplastic resin used for the present invention has a constituent unit derived from a dihydric phenol represented by General formula (2).

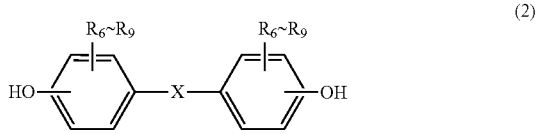

(2)

In General formula (2), $R_6$-$R_9$ each independently represent hydrogen, a halogen, a nitro, an optionally substituted C1-C20 alkyl group, an optionally substituted C1-C5 alkoxy group, an optionally substituted C6-C12 aryl group, an optionally substituted C7-C17 aralkyl group or an optionally substituted C2-C15 alkenyl group, and preferably represent hydrogen or a methyl group.

In General formula (2), X is —O—, —S—, —SO—, —SO$_2$—, —CO— or a divalent group represented by any one of Formulae (3)-(6) below.

(3)

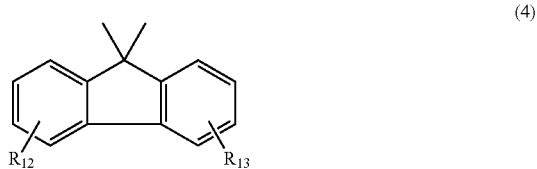

(4)

(5)

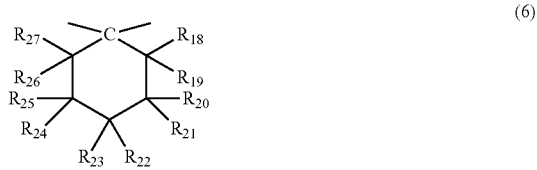

(6)

In Formula (3), $R_{10}$ and $R_{11}$ each independently represent hydrogen, a halogen, an optionally substituted C1-C20 alkyl group, an optionally substituted C1-C5 alkoxy group, an optionally substituted C6-C12 aryl group, an optionally substituted. C7-C17 aralkyl group or an optionally substituted C2-C15 alkenyl group, or $R_{10}$ and $R_{11}$ bond with each other to form a C3-C20 carbon ring or a C1-C20 heterocyclic ring.

From the viewpoint of the availability of the raw material, $R_{10}$ preferably represents a C1-C3 alkyl group or a C6-C12 aryl group.

From the viewpoint of the availability of the raw material, $R_{11}$ preferably represents a C1-C3 alkyl group or a C6-C12 aryl group.

Moreover, from the viewpoint of the availability of the raw materials, $R_{10}$ and $R_{11}$ preferably bond with each other to form a C6-C12 carbon ring.

While c represents an integer of 0-20, it preferably represents 1 or 2 from the viewpoint of the availability of the raw material.

In Formula (4), $R_{12}$ and $R_{13}$ each independently represent hydrogen, a halogen, an optionally substituted C1-C20 alkyl group, an optionally substituted C1-C5 alkoxy group, an optionally substituted C6-C12 aryl group, an optionally substituted C7-C17 aralkyl group or an optionally substituted C2-C15 alkenyl group, or $R_{12}$ and $R_{13}$ bond with each other to form a C3-C20 carbon ring or a C1-C20 heterocyclic ring.

From the viewpoint of the availability of the raw material, $R_{12}$ preferably represents hydrogen or a methyl group.

From the viewpoint of the availability of the raw material, $R_{13}$ preferably represents hydrogen or a methyl group.

Moreover, from the viewpoint of the availability of the raw materials, $R_{12}$ and $R_{13}$ preferably bond with each other to form a C5-C12 carbon ring.

In Formula (5), $R_{14}$-$R_{17}$ each independently represent hydrogen, a halogen, an optionally substituted C1-C20 (preferably C1-C9) alkyl group, an optionally substituted C1-C5 (preferably C1-C3) alkoxy group, an optionally substituted C6-C12 (preferably C6-C8) aryl group, an optionally substituted C7-C17 (preferably C7-C12) aralkyl group or an optionally substituted C2-C15 (preferably C2-C5) alkenyl group. The optional substituent may be a halogen, a C1-C20 alkyl group or a C6-C12 aryl group. Moreover, $R_{14}$ and $R_{15}$, and $R_{16}$ and $R_{17}$ may bond with each other, respectively, to form a C3-C20 carbon ring or a C1-C20 heterocyclic ring.

In Formula (6), $R_{18}$-$R_{27}$ each independently represent hydrogen or a C1-C3 alkyl group, where at least one of $R_{18}$-$R_{27}$ is a C1-C3 alkyl group.

From the viewpoint of the availability of the raw materials, $R_{18}$-$R_{27}$ preferably each independently represent hydrogen or a methyl group.

At least one of the polycarbonate resin and the polyarylate resin contained in the thermoplastic resin used for the present invention preferably contains a constituent unit derived from a dihydric phenol represented by General formula (2) above for 20-100 mass %, more preferably for 40-100 mass % and particularly preferably for 60-100 mass %, from the viewpoint of molding workability of the resulting carbon fiber reinforced thermoplastic resin. If at least one of the polycarbonate resin and the polyarylate resin is a copolymer, a constituent unit other than the constituent unit represented by General formula (2) above may be contained without impairing the effect of the present invention.

From the viewpoints of the availability and the purity of the raw material, examples of the dihydric phenol of General formula (2) above used in the polycarbonate resin contained in the thermoplastic resin of the present invention include 2,2-bis(4-hydroxyphenyl)propane [=bisphenol A], bis(4-hydroxyphenyl)-p-diisopropyl benzene, 4,4'-dihydroxy diphenyl, 2,2-bis(4-hydroxy-3,5-dimethylphenyl)propane, 2,2-bis(4-hydroxy-3-methylphenyl)propane, 2,2-bis(4-hydroxy-3,5-diethylphenyl)propane, 2,2-bis(4-hydroxy-3-ethylphenyl)propane, 2,2-bis(4-hydroxy-3,5-diphenylphenyl)propane, 2,2-bis(4-hydroxy-3-phenylphenyl)propane, 2,2-bis(4-hydroxy-3,5-dibromophenyl)propane, 2,2-bis(4-hydroxy-3-bromophenyl)propane, 2,2-bis(4-hydroxyphenyl)pentane, 2,4'-dihydroxy-diphenylmethane, bis-(4-hydroxy-3-methylphenyl)methane, bis-(4-hydroxy-3-nitrophenyl)methane, 1,1-bis(4-hydroxyphenyl)ethane, 1,1-bis(4-hydroxy-3-methylphenyl)ethane, 3,3-bis(4-hydroxyphenyl)pentane, 1,1-bis(4-hydroxyphenyl)cyclohexane [=bisphenol Z], bis(4-hydroxyphenyl)sulfone, 2,4'-dihydroxy diphenylsulfone, bis(4-hydroxyphenyl)sulfide, 4,4'-dihydroxy diphenyl ether, 4,4'-dihydroxy-3,3'-dimethyl diphenyl ether, 4,4'-dihydroxy-2,5-diethoxy diphenyl ether, 1-phenyl-1,1-bis(4-hydroxyphenyl)ethane, 1,1-bis(4-hydroxy-3-methylphenyl)cyclohexane, 1-phenyl-1,1-bis(4-hydroxy-3-methylphenyl)

ethane, bis(4-hydroxyphenyl)diphenylmethane, bis(4-hydroxy-3-methylphenyl)diphenylmethane, 9,9-bis(4-hydroxyphenyl)fluorene, 9,9-bis(4-hydroxy-3-methylphenyl)fluorene, and 2,2-bis(4-hydroxyphenyl)hexafluoropropane, where it is preferably a bis(4-hydroxyphenyl)alkane, and particularly preferably 2,2-bis(4-hydroxyphenyl)propane [bisphenol A]. These aromatic dihydroxy compounds may be used alone or two or more of them may be used in mixture.

The polycarbonate resin used for the present invention preferably has a viscosity-average molecular weight of 10,000-100,000, more preferably 14,000-60,000 and still more preferably 16,000-40,000 so as to have a solution viscosity that allows easy handling of the resin as a solution.

From the viewpoints of the availability and the purity of the raw material, examples of the dihydric phenol of General formula (2) above used in the polyarylate resin contained in the thermoplastic resin of the present invention include 2,2-bis(4-hydroxyphenyl)propane [=bisphenol A], bis(4-hydroxyphenyl)-p-diisopropyl benzene, 4,4'-dihydroxy diphenyl, 2,2-bis(4-hydroxy-3,5-dimethylphenyl)propane, 2,2-bis(4-hydroxy-3-methylphenyl)propane, 2,2-bis(4-hydroxy-3,5-diethylphenyl)propane, 2,2-bis(4-hydroxy-3-ethylphenyl)propane, 2,2-bis(4-hydroxy-3,5-diphenylphenyl)propane, 2,2-bis(4-hydroxy-3-phenylphenyl)propane, 2,2-bis(4-hydroxy-3,5-dibromophenyl)propane, 2,2-bis(4-hydroxy-3-bromophenyl)propane, 2,2-bis(4-hydroxyphenyl)pentane, 2,4'-dihydroxy-diphenylmethane, bis-(4-hydroxy-3-methylphenyl)methane, bis-(4-hydroxy-3-nitrophenyl)methane, 1,1-bis(4-hydroxyphenyl)ethane, 1,1-bis(4-hydroxy-3-methylphenyl)ethane, 3,3-bis(4-hydroxyphenyl)pentane, 1,1-bis(4-hydroxyphenyl)cyclohexane [=bisphenol Z], bis(4-hydroxyphenyl)sulfone, 2,4'-dihydroxy diphenylsulfone, bis(4-hydroxyphenyl)sulfide, 4,4'-dihydroxy diphenyl ether, 4,4'-dihydroxy-3,3'-dimethyl diphenyl ether, 4,4'-dihydroxy-2,5-diethoxy diphenyl ether, 1-phenyl-1,1-bis(4-hydroxyphenyl)ethane, 1,1-bis(4-hydroxy-3-methylphenyl)cyclohexane, 1-phenyl-1,1-bis(4-hydroxy-3-methylphenyl)ethane, bis(4-hydroxyphenyl)diphenylmethane, bis(4-hydroxy-3-methylphenyl)diphenylmethane, 9,9-bis(4-hydroxyphenyl)fluorene, 9,9-bis(4-hydroxy-3-methylphenyl)fluorene, and 2,2-bis(4-hydroxyphenyl)hexafluoropropane, where it is preferably a bis(4-hydroxyphenyl)alkane and particularly preferably 2,2-bis(4-hydroxyphenyl)propane [bisphenol A]. These aromatic dihydroxy compounds may be used alone or two or more of them may be used in mixture.

The polyarylate resin used for the present invention preferably has a viscosity-average molecular weight of 10,000-100,000, more preferably 14,000-60,000 and still more preferably 16,000-40,000 so as to have a solution viscosity that allows easy handling of the resin as a solution.

As long as the effect of the present invention is exhibited, the thermoplastic resin may contain a component other than at least one of the polycarbonate resin and the polyarylate resin, and may be blended with other resin and various additives such as a mold release agent, a flame retardant, an antioxidant, a heat stabilizer, a flame retardant auxiliary, an ultraviolet absorber, a colorant, an antistatic agent, a fluorescent bleach, an anti-fog agent, a fluidity improving agent, a plasticizer, a dispersant and an antibacterial agent.

Examples of other resin include polycarbonate resins other than the polycarbonate resin used according to the present invention, polyarylate resins other than the polyarylate resin used according to the present invention, thermoplastic polyester resins such as a polyethylene terephthalate resin (PET resin), polytrimethylene terephthalate (PTT resin) and a polybutylene terephthalate resin (PBT resin); styrene-based resins such as a polystyrene resin (PS resin), a high impact polystyrene resin (HIPS), an acrylonitrile-styrene copolymer (AS resin) and a methyl methacrylate-styrene copolymer (MS resin); elastomers such as a core-shell structured elastomer like a methyl methacrylate-acrylic rubber-styrene copolymer (MAS) and a polyester-based elastomer; polyolefin resins such as a cyclic cycloolefin resin (COP resin) and a cyclic cycloolefin (COP) copolymer resin; a polyamide resin (PA resin); a polyimide resin (PI resin); a polyetherimide resin (PEI resin); a polyurethane resin (PU resin); a polyphenylene ether resin (PPE resin); a polyphenylene sulfide resin (PPS resin); a polysulfone resin (PSU resin); a polymethacrylate resin (PMMA resin); and polycaprolactone.

The proportion of these components in 100 mass % of the thermoplastic resin is preferably 0-50 mass % and more preferably 0-20 mass %.

Dichloromethane

The sheet of the present invention is characterized in that the content of dichloromethane contained in the sheet is 10-10,000 ppm by mass. The content of dichloromethane contained in the sheet is preferably 10-5,000 ppm by mass, and more preferably 10-1,000 ppm by mass. If the content of dichloromethane exceeds 10,000 ppm by mass, gas may be generated upon heat processing the sheet of the present invention by press molding or the like due to dichloromethane contained, or the sheet may have poor appearance (void) after the heat processing.

The method for measuring the content of dichloromethane contained in the sheet of the present invention is described in the later-described examples.

According to the present invention, the process for adjusting the content of dichloromethane contained in the sheet to 10-10,000 ppm by mass and acquiring good sheet appearance at the same time may be, for example, to adjust the drying temperature and the drying time in the step of evaporating dichloromethane from the carbon fibers impregnated with the thermoplastic resin solution obtained by dissolving the thermoplastic resin containing at least one of the polycarbonate resin and the polyarylate resin in dichloromethane. Specifically, dichloromethane is preferably evaporated to some degree, for example, by drying without external heating (e.g., air drying) or with a little aid of external heating, and then drying with an aid of external heating. Air drying may be carried out by simply leaving the carbon fiber at room temperature, where air may be sent to speed up the drying.

Carbon Fiber Reinforced Thermoplastic Resin

The proportion of the carbon fibers and the thermoplastic resin in the carbon fiber reinforced thermoplastic resin of the present invention is preferably such that the carbon fibers account for 20-80 vol % while the thermoplastic resin accounts for 80-20 vol %, more preferably such that the carbon fibers account for 30-70 vol % while the thermoplastic resin accounts for 70-30 vol %, and still more preferably such that the carbon fibers account for 40-60 vol % while the thermoplastic resin accounts for 60-40 vol % from the viewpoint of the mechanical strength of the carbon fiber reinforced thermoplastic resin.

If the proportion of the carbon fibers falls below this range, the mechanical properties of the carbon fiber reinforced thermoplastic resin will be equal to or poorer than those of lightweight metals. On the other hand, if the proportion of the carbon fibers exceeds this range, the amount of the resin will be small and thus the action of the matrix resin to bundle the carbon fibers may not be effective, in which case the mechanical strength is deteriorated.

The carbon fiber reinforced thermoplastic resin of the present invention may contain a component other than the carbon fibers, the thermoplastic resin and dichloromethane. Examples of such component include other resin and various additives such as a mold release agent, a flame retardant, an antioxidant, a heat stabilizer, a flame retardant auxiliary, an ultraviolet absorber, a colorant, an antistatic agent, a fluorescent bleach, an anti-fog agent, a fluidity improving agent, a plasticizer, a dispersant and an antibacterial agent.

While the thickness of the sheet of the present invention is not particularly limited, it is preferably 0.01 mm-1 mm and more preferably 0.05 mm-0.5 mm.

An example of the method for producing a laminate sheet by laminating the sheet of the present invention includes a press molding method.

Method for Producing Carbon Fiber Reinforced Thermoplastic Resin Sheet

A method for producing a carbon fiber reinforced thermoplastic resin sheet of the present invention comprises the steps of: producing a thermoplastic resin solution by an interfacial polymerization process by dissolving a thermoplastic resin containing at least one of a polycarbonate resin and a polyarylate resin in dichloromethane; impregnating carbon fibers with the thermoplastic resin solution; and evaporating dichloromethane from the carbon fibers impregnated with the thermoplastic resin solution, wherein at least one of the polycarbonate resin and the polyarylate resin has a terminal structure derived from a monohydric phenol represented by General formula (1) above and a constituent unit derived from a dihydric phenol.

According to the production method of the present invention, the concentration of the polycarbonate resin in the thermoplastic resin solution is preferably 10-30 mass %, and more preferably 12-25 mass %. If the concentration of the polycarbonate resin is lower than 10 mass %, bubbling may occur during drying in the subsequent step whereas if the concentration is higher than 30 mass %, the solution viscosity may become significantly high which could render handling in the impregnating step difficult.

Moreover, according to the production method of the present invention, the concentration of the polyarylate resin in the thermoplastic resin solution is preferably 10-30 mass %, and more preferably 12-25 mass %. If the concentration of the polyarylate resin is lower than 10 mass %, bubbling may occur during drying in the subsequent step whereas if the concentration is higher than 30 mass %, the solution viscosity may become significantly high which could render handling in the impregnating step difficult.

Step of Producing Thermoplastic Resin Solution

For the reaction of the interfacial polymerization process, reactants including a dihydric phenol, a monohydric phenol as a chain terminator and, if necessary, an antioxidant used for preventing oxidation of the dihydric phenol and phosgene or triphosgene as a carbonate binder, are mixed in the presence of dichloromethane and an alkaline aqueous solution while keeping normal pH at 10 or higher. Thereafter, a polymerization catalyst such as a tertiary amine or a quaternary ammonium salt is added to carry out the interfacial polymerization and the resulting resin solution is purified to give a polycarbonate resin solution. The timing of adding the chain terminator is not particularly limited as long as it is added at some point between the phosgenation to the start of the polymerization reaction. Here, the reaction temperature is 0-35° C. and the reaction time is several minutes to several hours.

Impregnating Step

This is a step of impregnating carbon fibers with the polycarbonate resin solution of the present invention. The impregnating method is not particularly limited, and various methods such as a method of immersing the fibers in a tank containing the solution, a method of passing the fibers through a spray of the solution atomized in a tank, or a method of spraying the solution to the fibers may be employed. Among them, the method of immersing the fibers in a tank containing the solution is favorable since it is most convenient and allows uniform application of the solution.

Evaporation (Drying) Step

This is a step of evaporating dichloromethane from the carbon fibers impregnated with the thermoplastic resin solution such as the polycarbonate resin solution. Dichloromethane is preferably evaporated to some degree, for example, by subjecting it to drying without external heating (e.g., air drying) or with a little aid of external heating, and then to drying with an aid of external heating. Air drying may be carried out by simply leaving the carbon fiber at room temperature, where air may be sent to speed up the drying

EXAMPLES

Hereinafter, the present invention will be described specifically by way of examples and comparative examples. The embodiments may appropriately be altered as long as the effect of the invention is achieved.

Conditions for Measuring Viscosity-Average Molecular Weight (Mv)

Measurement instrument: Ubbelohde capillary viscometer
Solvent: Dichloromethane
Concentration of resin solution: 0.5 grams/deciliter
Measurement temperature: 25° C.

Subsequent to a measurement under the above conditions, the intrinsic viscosity [η] deciliter/gram is determined at a Huggins coefficient of 0.45 to calculate the viscosity-average molecular weight by the following equation.

$$\eta = 1.23 \times 10^{-4} \times Mv^{0.83}$$

Conditions for Measuring Content of Dichloromethane

Measurement instrument: Gas chromatograph (GC-2014 manufactured by Shimadzu Corporation)
Solvent: Chloroform
Concentration of carbon fiber reinforced thermoplastic resin solution: 2 grams/20 milliliters
Sample vaporization chamber: 200° C., 252 kPA
Column: 60° C. at the start of measurement, 120° C. at the end of measurement, measurement time 10 minutes
Detector: 320° C.

Subsequent to a measurement under the above conditions, a peak area at a retention time of 4.4 minutes was determined to calculate the content of dichloromethane based on the separately calculated calibration curve.

Conditions for Measuring Carbon Fiber Content (Vf)

The carbon fiber content was measured based on JIS K 7075.

Conditions for Measuring Amount of Heat Deformation

Test piece: 80 mm×10 mm
Load: 5 g counterweight (diameter 8 mm)
Test tank: Natural-convection-type thermostatic dryer
Distance between support points: 60 mm
Both ends of a test piece were placed on a frame for 10 mm each without fixing (support points), a 5 g counterweight was placed as a load on the center of the test piece, and the resultant was heat treated at a predetermined temperature for a minute. The heat-treated test piece was taken out from the test tank to measure the difference in heights resulting from the deformation between the both ends and the center of the test piece as an amount of heat deformation.

Example 1

Step of Producing Polycarbonate Resin Solution 100 g (0.44 mol) of bisphenol A (BPA) manufactured by New Nippon Steel Chemical and 0.3 g of hydrosulfite as an antioxidant were added to and dissolved in 650 ml of a 9 m/m % aqueous sodium hydroxide solution. To this, 385 ml of dichloromethane was added, and 60.0 g of phosgene was blown into the resultant by spending 40 minutes while stirring and keeping the solution temperature in a range of 15° C.-25° C.

At the end of the phosgene blowing, 100 ml of a 9 m/m % aqueous sodium hydroxide solution and a solution obtained by dissolving 6.23 g (0.017 mol) of cetyl-4-hydroxybenzoate (CEPB) manufactured by Ueno Fine Chemicals Industry in 100 ml of dichloromethane were added and vigorously stirred for emulsification. Thereafter, 0.2 ml of triethylamine as a polymerization catalyst was added to allow polymerization for about 40 minutes. The polymerization solution was separated into a water phase and an organic phase, the organic phase was neutralized with phosphoric acid and repeatedly rinsed with pure water until the pH of the rinsing solution became neutral. The concentration of the purified polycarbonate resin solution was 15 mass %.

The resulting polycarbonate resin solution was used to measure the viscosity-average molecular weight, which turned out to be 26,000.

Impregnating and Drying Steps

A carbon fiber textile (TORAYCA cloth CO6347B manufactured by Toray Industries) was cut into a size of 10 cm×10 cm, which was impregnated with the resin solution obtained in the step of producing the polycarbonate resin solution in an impregnation tank. At the end of the impregnation, the resultant was dried in a thermostatic chamber at 25° C. for 5 hours, and then dried in a hot air dryer at 100° C. for an hour to give a continuous fiber reinforced thermoplastic resin (CFRTP1).

The carbon fiber content of the resulting carbon fiber reinforced thermoplastic resin was 55 vol %. The resulting carbon fiber reinforced thermoplastic resin was used to measure the dichloromethane content, which turned out to be 30 ppm by mass. The thickness of the resulting carbon fiber reinforced thermoplastic resin was 0.235 mm.

Evaluation of Appearance Before Molding

The resulting carbon fiber reinforced thermoplastic resin was observed with an optical microscope, where no whitening or lifting was found on the surface of the resin and thus the appearance was "good".

Evaluation of Appearance After Molding

The resulting carbon fiber reinforced thermoplastic resin was pressed at 100 kgf for 5 minutes while being heated at 265° C. to obtain a sheet for evaluating the appearance. No void was found in the resulting sheet for evaluating the appearance, and thus the appearance was "good". The results are summarized in Table 1.

Evaluation of Amount of Heat Deformation

Test pieces were cut out from the resulting carbon fiber reinforced thermoplastic resin, where the amount of heat deformation measured at 120° C. was 1 mm or less. The amount of heat deformation similarly measured at 130° C. was 2 mm. The amount of heat deformation similarly measured at 150° C. was 8 mm. The results are summarized in Table 2.

Example 2

Steps of Producing Polycarbonate Resin Solution, Impregnating and Drying

A 15 mass % polycarbonate resin solution and a continuous fiber reinforced thermoplastic resin (CFRTP2) were obtained by using the polycarbonate resin solution obtained in Example 1 and operating in the same manner as Example 1 except that drying was conducted at the end of the impregnation in a thermostatic chamber at 25° C. for 10 hours without the subsequent drying in a hot air dryer at 100° C. for an hour.

The carbon fiber content of the resulting carbon fiber reinforced thermoplastic resin was 53 vol %. The resulting carbon fiber reinforced thermoplastic resin was used to measure the dichloromethane content, which turned out to be 1,200 ppm by mass. Moreover, the viscosity-average molecular weight was 26,000. The thickness of the resulting carbon fiber reinforced thermoplastic resin was 0.275 mm.

Evaluation of Appearance Before Molding

The resulting carbon fiber reinforced thermoplastic resin was observed with an optical microscope, where no whitening or lifting was found on the surface of the resin and thus the appearance was "good".

Evaluation of Appearance After Molding

The resulting carbon fiber reinforced thermoplastic resin was pressed at 100 kgf for 5 minutes while being heated at 265° C. to obtain a sheet for evaluating the appearance. No void was found in the resulting sheet for evaluating the appearance, and thus the appearance was "good". The results are summarized in Table 1.

Example 3

Steps of Producing Polycarbonate Resin Solution, Impregnating and Drying

A 15 mass % polycarbonate resin solution and a continuous fiber reinforced thermoplastic resin (CFRTP3) were obtained by using the polycarbonate resin solution obtained in Example 1 and operating in the same manner as Example 1 except that drying was conducted at the end of the impregnation in a thermostatic chamber at 25° C. for 5 hours without the subsequent drying in a hot air dryer at 100° C. for an hour.

The carbon fiber content of the resulting carbon fiber reinforced thermoplastic resin was 52 vol %. The resulting carbon fiber reinforced thermoplastic resin was used to measure the dichloromethane content, which turned out to be 5,440 ppm by mass. Moreover, the viscosity-average molecular weight was 26,000. The thickness of the resulting carbon fiber reinforced thermoplastic resin was 0.249 mm.

Evaluation of Appearance Before Molding

The resulting carbon fiber reinforced thermoplastic resin was observed with an optical microscope, where no whitening or lifting was found on the surface of the resin and thus the appearance was "good".

Evaluation of Appearance After Molding

The resulting carbon fiber reinforced thermoplastic resin was pressed at 100 kgf for 5 minutes while being heated at 265° C. to obtain a sheet for evaluating the appearance. No void was found in the resulting sheet for evaluating the appearance, and thus the appearance was "good". The results are summarized in Table 1.

Example 4

Step of Producing Polycarbonate Resin Solution 90 g (0.39 mol) of bisphenol A (BPA) manufactured by New Nippon Steel Chemical and 0.3 g of hydrosulfite as an antioxidant were added to and dissolved in 650 ml of a 9 m/m % aqueous sodium hydroxide solution. To this, 400 ml of dichloromethane was added, and 54.6 g of phosgene was blown into the resultant by spending 40 minutes while stirring and keeping the solution temperature in a range of 15° C.-25° C.

At the end of the phosgene blowing, 100 ml of a 9 m/m % aqueous sodium hydroxide solution and a solution obtained by dissolving 4.23 g (0.02 mol) of 2-ethylhexyl-4-hydroxybenzoate (EHPB) manufactured by Ueno Fine Chemicals Industry in 50 ml of dichloromethane were added and vigorously stirred for emulsification. Thereafter, 0.2 ml of triethylamine as a polymerization catalyst was added to allow polymerization for about 40 minutes.

The polymerization solution was separated into a water phase and an organic phase, the organic phase was neutralized with phosphoric acid and repeatedly rinsed with pure water until the pH of the rinsing solution became neutral. The concentration of the purified polycarbonate resin solution was 15 mass %.

The resulting polycarbonate resin solution was used to measure the viscosity-average molecular weight, which turned out to be 23,500.

Impregnating and Drying Steps

A carbon fiber textile (TORAYCA cloth CO6347B manufactured by Toray Industries) was cut into a size of 10 cm×10 cm, which was impregnated with the polycarbonate resin solution in an impregnation tank. At the end of the impregnation, the resultant was dried in a thermostatic chamber at 25° C. for 5 hours, and then dried in a hot air dryer at 100° C. for an hour to give a carbon fiber reinforced thermoplastic resin (CFRTP4).

The carbon fiber content of the resulting carbon fiber reinforced thermoplastic resin was 53 vol %. The resulting carbon fiber reinforced thermoplastic resin was used to measure the dichloromethane content, which turned out to be 140 ppm. The thickness of the resulting carbon fiber reinforced thermoplastic resin was 0.257 mm.

Evaluation of Appearance Before Molding

The resulting carbon fiber reinforced thermoplastic resin was observed with an optical microscope, where no whitening or lifting was found on the surface of the resin and thus the appearance was "good".

Evaluation of Appearance After Molding

The resulting carbon fiber reinforced thermoplastic resin was pressed at 100 kgf for 5 minutes while being heated at 265° C. to obtain a sheet for evaluating the appearance. No void was found in the resulting sheet for evaluating the appearance, and thus the appearance was "good".

Evaluation of Amount of Heat Deformation

Test pieces were cut out from the resulting carbon fiber reinforced thermoplastic resin, where the amount of heat deformation measured at 130° C. was 1 mm or less. The amount of heat deformation similarly measured at 140° C. was 3 mm. The amount of heat deformation similarly measured at 150° C. was 8 mm. The results are summarized in Table 2.

Example 5

Step of Producing Polycarbonate Resin Solution 100 g (0.44 mol) of bisphenol A (BPA) manufactured by New Nippon Steel Chemical and 0.3 g of hydrosulfite as an antioxidant were added to and dissolved in 650 ml of a 9 m/m % aqueous sodium hydroxide solution. To this, 400 ml of dichloromethane was added, and 60 g of phosgene was blown into the resultant by spending 40 minutes while stirring and keeping the solution temperature in a range of 15° C.-25° C.

At the end of the phosgene blowing, 100 ml of a 9 m/m % aqueous sodium hydroxide solution and a solution obtained by dissolving 5.26 g (0.02 mol) of dodecyl-4-hydroxybenzoate (PODB) manufactured by Ueno Fine Chemicals Industry in 100 ml of dichloromethane were added and vigorously stirred for emulsification. Thereafter, 0.2 ml of triethylamine as a polymerization catalyst was added to allow polymerization for about 40 minutes. The polymerization solution was separated into a water phase and an organic phase, the organic phase was neutralized with phosphoric acid and repeatedly rinsed with pure water until the pH of the rinsing solution became neutral. The concentration of the purified polycarbonate resin solution was 15 mass %.

The resulting polycarbonate resin solution was used to measure the viscosity-average molecular weight, which turned out to be 24,500.

Impregnating and Drying Steps

A carbon fiber textile (TORAYCA cloth CO6347B manufactured by Toray Industries) was cut into a size of 10 cm×10 cm, which was impregnated with the polycarbonate resin solution in an impregnation tank. At the end of the impregnation, the resultant was dried in a thermostatic chamber at 25° C. for 5 hours, and then dried in a hot air dryer at 100° C. for an hour to give a carbon fiber reinforced thermoplastic resin (CFRTP5).

The carbon fiber content of the resulting carbon fiber reinforced thermoplastic resin was 58 vol %. The resulting carbon fiber reinforced thermoplastic resin was used to measure the dichloromethane content, which turned out to be 100 ppm. The thickness of the resulting carbon fiber reinforced thermoplastic resin was 0.277 mm.

Evaluation of Appearance Before Molding

The resulting carbon fiber reinforced thermoplastic resin was observed with an optical microscope, where no whitening or lifting was found on the surface of the resin and thus the appearance was "good".

Evaluation of Appearance After Molding

The resulting carbon fiber reinforced thermoplastic resin was pressed at 100 kgf for 5 minutes while being heated at 265° C. to obtain a sheet for evaluating the appearance. No void was found in the resulting sheet for evaluating the appearance, and thus the appearance was "good".

Evaluation of Amount of Heat Deformation

Test pieces were cut out from the resulting carbon fiber reinforced thermoplastic resin, where the amount of heat deformation measured at 130° C. was 1 mm or less. The amount of heat deformation similarly measured at 140° C. was 4 mm. The amount of heat deformation similarly measured at 150° C. was 9 mm. The results are shown in Table 2.

Comparative Example 1

Step of Producing Polycarbonate Resin Solution 7.5 kg (32.89 mol) of bisphenol A (BPA) manufactured by Nippon Steel and Sumikin Chemical and 30 g of hydrosulfite as an antioxidant were added to and dissolved in 54 kg of a 9 m/m % aqueous sodium hydroxide solution. To this, 40 kg of dichloromethane was added, and 4.4 kg of phosgene was blown into the resultant by spending 30 minutes while stirring and keeping the solution temperature in a range of 15° C.-25° C.

After the phosgene blowing, 2 kg of a 9 m/m % aqueous sodium hydroxide solution, 7.5 kg of dichloromethane, and a solution obtained by dissolving 193.5 g (1.29 mol) of p-tert-butylphenol in 1 kg of dichloromethane were added and vigorously stirred for emulsification. Thereafter, 10 ml of triethylamine as a polymerization catalyst was added to allow polymerization for about 40 minutes.

The polymerization solution was separated into a water phase and an organic phase, the organic phase was neutralized with phosphoric acid and repeatedly rinsed with pure water until the pH of the rinsing solution became neutral. The concentration of the purified polycarbonate resin solution was 15 mass %.

The resulting polycarbonate resin solution was used to measure the viscosity-average molecular weight, which turned out to be 21,500.

Impregnating and Drying Steps

A continuous fiber reinforced thermoplastic resin (CFRTP6) was obtained by using the resin solution obtained in the step of producing the polycarbonate resin solution and operating in the same manner as Example 1 except that drying was conducted at the end of the impregnation in a thermostatic chamber at 25° C. for 5 hours and then in a hot air dryer at 100° C. for 2 hours.

The carbon fiber content of the resulting carbon fiber reinforced thermoplastic resin was 57 vol %. The resulting carbon fiber reinforced thermoplastic resin was used to measure the dichloromethane content, which turned out to be 50 ppm by mass. The thickness of the resulting carbon fiber reinforced thermoplastic resin was 0.268 mm.

Evaluation of Appearance Before Molding

The resulting carbon fiber reinforced thermoplastic resin was observed with an optical microscope, where whitening and lifting were found on the surface of the resin and thus the appearance was "poor".

Evaluation of Appearance After Molding

The resulting carbon fiber reinforced thermoplastic resin was pressed at 100 kgf for 5 minutes while being heated at 265° C. to obtain a sheet for evaluating the appearance. No void was found in the resulting sheet for evaluating the appearance, and thus the appearance was "good". The results are summarized in Table 1.

Evaluation of Amount of Heat Deformation

Test pieces were cut out from the resulting carbon fiber reinforced thermoplastic resin, where the amount of heat deformation measured at 140° C. was 1 mm or less. The amount of heat deformation similarly measured at 150° C. was 2 mm. The amount of heat deformation similarly measured at 160° C. was 8 mm. The results are summarized in Table 2.

Comparative Example 2

Steps of Producing Polycarbonate Resin Solution, Impregnating and Drying

A 15 mass % polycarbonate resin solution and a continuous fiber reinforced thermoplastic resin (CFRTP7) were obtained by operating in the same manner as Example 1 except that drying was conducted at the end of the impregnation in a thermostatic chamber at 25° C. for an hour without the subsequent drying in a hot air dryer at 100° C. for an hour.

The carbon fiber content of the resulting carbon fiber reinforced thermoplastic resin was 59 vol %. The resulting carbon fiber reinforced thermoplastic resin was used to measure the dichloromethane content, which turned out to be 23,590 ppm by mass. Moreover, the viscosity-average molecular weight was 26,000. The thickness of the resulting carbon fiber reinforced thermoplastic resin was 0.235 mm.

Evaluation of Appearance Before Molding

The resulting carbon fiber reinforced thermoplastic resin was observed with an optical microscope, where no whitening or lifting was found on the surface of the resin and thus the appearance was "good".

Evaluation of Appearance After Molding

The resulting carbon fiber reinforced thermoplastic resin was pressed at 100 kgf for 5 minutes while being heated at 265° C. to obtain a sheet for evaluating the appearance. Voids were observed in the resulting sheet for evaluating the appearance, and thus the appearance was "poor". The results are summarized in Table 1.

Comparative Example 3

Steps of Producing Polycarbonate Resin Solution, Impregnating and Drying

A 15 mass % polycarbonate resin solution and a continuous fiber reinforced thermoplastic resin (CFRTP8) were obtained by operating in the same manner as Comparative example 1 except that drying was conducted at the end of the impregnation in a thermostatic chamber at 25° C. for 2 hours without the subsequent drying in a hot air dryer at 100° C. for 2 hours.

The carbon fiber content of the resulting carbon fiber reinforced thermoplastic resin was 58 vol %. The resulting carbon fiber reinforced thermoplastic resin was used to measure the dichloromethane content, which turned out to be 12,530 ppm by mass. Moreover, the viscosity-average molecular weight was 21,500. The thickness of the resulting carbon fiber reinforced thermoplastic resin was 0.252 mm.

Evaluation of Appearance Before Molding

The resulting carbon fiber reinforced thermoplastic resin was observed with an optical microscope, where whitening and lifting were found on the surface of the resin and thus the appearance was "poor".

Evaluation of Appearance After Molding

The resulting carbon fiber reinforced thermoplastic resin was pressed at 100 kgf for 5 minutes while being heated at 265° C. to obtain a sheet for evaluating the appearance. Voids were observed in the resulting sheet for evaluating the appearance, and thus the appearance was "poor". The results are summarized in Table 1.

TABLE 2

| Example | Amount of heat deformation [mm] | | | | |
|---|---|---|---|---|---|
| | 120° C. | 130° C. | 140° C. | 150° C. | 160° C. |
| Example 1 | 1 or less | 2 | 8 | — | — |
| Example 2 | — | — | — | — | — |
| Example 3 | — | — | — | — | — |
| Example 4 | — | 1 or less | 3 | 8 | — |
| Example 5 | — | 1 or less | 4 | 9 | — |
| Comparative example 1 | — | — | 1 or less | 2 | 8 |
| Comparative example 2 | — | — | — | — | — |
| Comparative example 3 | — | — | — | — | — |

The invention claimed is:

1. A sheet formed from a carbon fiber reinforced thermoplastic resin comprising carbon fibers, dichloromethane and a thermoplastic resin containing at least one of a polycarbonate resin and a polyarylate resin, wherein at least one of the polycarbonate resin and the polyarylate resin has a terminal structure derived from a monohydric phenol represented by General formula (1) below and a constituent unit derived from a dihydric phenol, and the content of dichloromethane contained in the sheet is 10-10,000 ppm by mass:

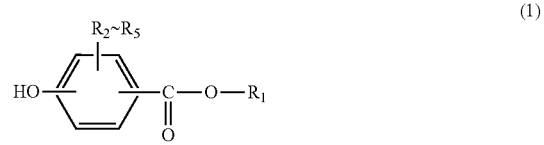

(in General formula (1), $R_1$ represents a C8-C36 alkyl group or a C8-C36 alkenyl group, and $R_2$-$R_5$ each independently represent hydrogen, a halogen, an optionally substituted C1-C20 alkyl group or an optionally substituted C6-C12 aryl group).

2. The sheet according to claim 1, wherein the carbon fibers are continuous fibers.

3. The sheet according to claim 1, wherein the sheet comprises the carbon fibers for 20-80 vol % and the thermoplastic resin for 80-20 vol %.

TABLE 1

| Example | Terminal structure | Constituent unit | Viscosity-average molecular weight | Drying conditions | Vf [%] | Dichloromethane content | Thickness [mm] | Evaluation of appearance | |
|---|---|---|---|---|---|---|---|---|---|
| | | | | | | | | Before molding | After molding |
| Example 1 | CEPB | BPA | 26,000 | 25° C./5 hr, 100° C./1 hr | 55 | 30 | 0.235 | Good | Good |
| Example 2 | CEPB | BPA | 26,000 | 25° C./10 hr | 53 | 1,200 | 0.275 | Good | Good |
| Example 3 | CEPB | BPA | 26,000 | 25° C./5 hr | 52 | 5,440 | 0.249 | Good | Good |
| Example 4 | EHPB | BPA | 23,500 | 25° C./5 hr, 100° C./1 hr | 53 | 140 | 0.257 | Good | Good |
| Example 5 | PODB | BPA | 24,500 | 25° C./5 hr, 100° C./1 hr | 58 | 100 | 0.277 | Good | Good |
| Comparative example 1 | PTBP | BPA | 21,500 | 25° C./5 hr, 100° C./2 hr | 57 | 50 | 0.268 | Poor | Good |
| Comparative example 2 | CEPB | BPA | 26,000 | 25° C./1 hr | 59 | 23,590 | 0.235 | Good | Poor |
| Comparative example 3 | PTBP | BPA | 21,500 | 25° C./2 hr | 58 | 12,530 | 0.252 | Poor | Poor |

CEPB: Cetyl-4-hydroxybenzoate
EHPB: 2-Ethylhexyl para-hydroxybenzoate
PODB: Dodecyl-4-hydroxybenzoate
PTBP: P-tert-butylphenol
BPA: Bisphenol A 4. The sheet according to claim 1, wherein the viscosity-average molecular weight of the polycarbonate resin and the polyarylate resin is 10,000-100,000.

5. The sheet according to claim 1, wherein the dihydric phenol is represented by General formula (2) below:

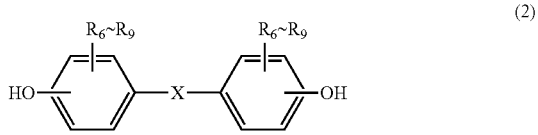

(in General formula (2), $R_6$-$R_9$ each independently represent hydrogen, a halogen, a nitro, an optionally substituted C1-C20 alkyl group, an optionally substituted C1-C5 alkoxy group, an optionally substituted C6-C12 aryl group, an optionally substituted C7-C17 aralkyl group or an optionally substituted C2-C15 alkenyl group; and X is —O—, —S—, —SO—, —SO$_2$—, —CO— or a divalent group represented by any of Formulae (3) to (6) below:

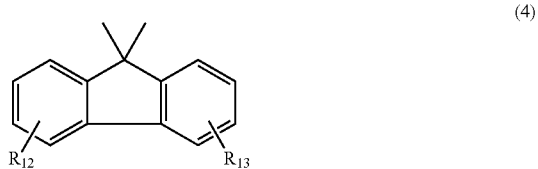

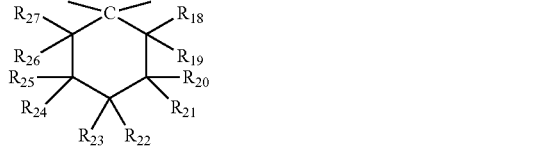

(in Formula (3), $R_{10}$ and $R_{11}$ each independently represent hydrogen, a halogen, an optionally substituted C1-C20 alkyl group, an optionally substituted C1-C5 alkoxy group, an optionally substituted C6-C12 aryl group, an optionally substituted C7-C17 aralkyl group or an optionally substituted C2-C15 alkenyl group, or $R_{10}$ and $R_{11}$ bond with each other to form a C3-C20 carbon ring or a C1-C20 heterocyclic ring; and c represents an integer of 0-20;

in Formula (4), $R_{12}$ and $R_{13}$ each independently represent hydrogen, a halogen, an optionally substituted C1-C20 alkyl group, an optionally substituted C1-C5 alkoxy group, an optionally substituted C6-C12 aryl group, an optionally substituted C7-C17 aralkyl group or an optionally substituted C2-C15 alkenyl group, or $R_{12}$ and $R_{13}$ bond with each other to form a C3-C20 carbon ring or a C1-C20 heterocyclic ring; and in Formula (5), $R_{14}$-$R_{17}$ each independently represent hydrogen, a halogen, an optionally substituted C1-C20 alkyl group, an optionally substituted C1-C5 alkoxy group, an optionally substituted C6-C12 aryl group, an optionally substituted C7-C17 aralkyl group or an optionally substituted C2-C15 alkenyl group, or $R_{14}$ and $R_{15}$, and $R_{16}$ and $R_{17}$ bond with each other, respectively, to form a C3-C20 carbon ring or a C1-C20 heterocyclic ring; and in Formula (6), $R_{18}$-$R_{27}$ each independently represent hydrogen or a C1-C3 alkyl group, where at least one of $R_{18}$-$R_{27}$ is a C1-C3 alkyl group).

6. A laminate sheet obtained by laminating the sheet according to claim 1.

7. A method for producing a carbon fiber reinforced thermoplastic resin sheet, the method comprising:

producing a thermoplastic resin solution by an interfacial polymerization process by dissolving a thermoplastic resin containing at least one of a polycarbonate resin and a polyarylate resin in dichloromethane;

impregnating carbon fibers with the thermoplastic resin solution; and evaporating dichloromethane from the carbon fibers impregnated with the thermoplastic resin solution, wherein at least one of the polycarbonate resin and the polyarylate resin has a terminal structure derived from a monohydric phenol represented by General formula (1) below and a constituent unit derived from a dihydric phenol:

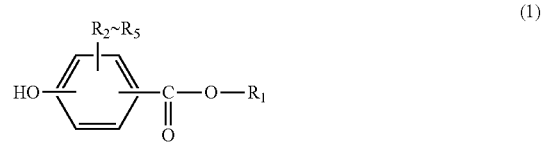

(in General formula (1), $R_1$ represents a C8-C36 alkyl group or a C8-C36 alkenyl group, and $R_2$-$R_5$ each independently represent hydrogen, a halogen, an optionally substituted C1-C20 alkyl group or an optionally substituted C6-C12 aryl group).

8. The production method according to claim 7, wherein the concentration of the polycarbonate resin and the polyarylate resin in the thermoplastic resin solution is 10-30 mass %.

* * * * *